US011689123B2

(12) United States Patent
Ebling et al.

(10) Patent No.: US 11,689,123 B2
(45) Date of Patent: Jun. 27, 2023

(54) MODULAR INFLATION SYSTEMS AND INFLATION SEGMENTS INCLUDING ARTIFICIAL MUSCLES

(71) Applicant: Toyota Motor Engineering & Manufacturing North America, Inc., Plano, TX (US)

(72) Inventors: Ty B. Ebling, Traverse City, MI (US); Michael P. Rowe, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 161 days.

(21) Appl. No.: 17/217,166

(22) Filed: Mar. 30, 2021

(65) Prior Publication Data

US 2022/0321034 A1 Oct. 6, 2022

(51) Int. Cl.
*H02N 11/00* (2006.01)
*B25J 9/12* (2006.01)

(52) U.S. Cl.
CPC .............. *H02N 11/006* (2013.01); *B25J 9/12* (2013.01)

(58) Field of Classification Search
CPC .......... H02N 11/00; H02N 1/00; H02N 1/002; H02N 1/006; B25J 9/12; B25J 9/1095; B25J 9/142; B25J 9/1075; A61G 7/05769; F15B 15/103; B60N 2/914; B60N 2/0232; B60N 2/0244; B62J 1/26
See application file for complete search history.

(56) References Cited

U.S. PATENT DOCUMENTS

| | | | | |
|---|---|---|---|---|
| 5,889,354 | A * | 3/1999 | Sager | F04B 43/14 310/330 |
| 6,080,027 | A | 6/2000 | Rodemann | |
| 6,179,586 | B1 * | 1/2001 | Herb | F04B 43/043 417/322 |
| 6,255,758 | B1 * | 7/2001 | Cabuz | H02N 1/006 29/25.35 |
| 6,646,364 | B1 * | 11/2003 | Horning | H02N 1/006 310/309 |
| 6,664,718 | B2 * | 12/2003 | Pelrine | H01L 41/0986 310/330 |

(Continued)

FOREIGN PATENT DOCUMENTS

| | | |
|---|---|---|
| CN | 87207671 U | 2/1988 |
| CN | 202923563 U | 5/2013 |

(Continued)

OTHER PUBLICATIONS

Car flotation airbag system (http://www.halfbakery.com/idea/Car_20flotation_20airbag_20system), accessed Aug. 3, 2020, 3 pages.

*Primary Examiner* — Burton S Mullins
(74) *Attorney, Agent, or Firm* — Dinsmore & Shohl LLP

(57) ABSTRACT

Modular inflation systems and inflation segments including an inflation enclosure and a plurality of artificial muscle layers provided within the inflation enclosure in a stacked arrangement, each of the plurality of artificial muscle layers including one or more artificial muscles, wherein one or more plurality of artificial muscles of each of the plurality of artificial muscle layers are operable between an actuated state and a non-actuated state, and one or more fastening members for attaching the inflation segment to another inflation segment.

19 Claims, 10 Drawing Sheets

(56) References Cited

U.S. PATENT DOCUMENTS

| | | | | |
|---|---|---|---|---|
| 6,679,836 | B2 * | 1/2004 | Couvillon, Jr. | A61M 25/0105 600/151 |
| 8,405,277 | B2 * | 3/2013 | Goyal | F03G 7/005 310/331 |
| 10,931,208 | B2 * | 2/2021 | Saneyoshi | B32B 7/12 |
| 10,995,779 | B2 * | 5/2021 | Keplinger | H02N 1/006 |
| 2005/0067919 | A1 * | 3/2005 | Horning | H02N 1/006 310/309 |
| 2021/0085091 | A1 * | 3/2021 | Brandt | A47C 27/18 |
| 2022/0088773 | A1 * | 3/2022 | Zou | B25J 9/14 |

FOREIGN PATENT DOCUMENTS

| | | | |
|---|---|---|---|
| CN | 204120606 | U | 1/2015 |
| CN | 107284390 | A | 10/2017 |
| CN | 102785630 | A | 11/2021 |
| JP | 2012192757 | A | 10/2012 |
| JP | 3223789 | B2 | 10/2019 |
| WO | 2003082666 | A1 | 10/2003 |

* cited by examiner

MODULAR INFLATION SYSTEMS AND INFLATION SEGMENTS INCLUDING ARTIFICIAL MUSCLES

TECHNICAL FIELD

The present specification generally relates to inflation systems and methods for actuating inflation systems including artificial muscles, and, more specifically, modular inflation systems including a plurality of individual inflation segments.

BACKGROUND

Current inflation systems may include robotic technologies that rely on rigid components, such as servomotors to perform tasks, often in a structured environment. This rigidity presents limitations in many robotic applications, caused, at least in part, by the weight-to-power ratio of servomotors and other rigid robotics devices. The field of soft robotics improves on these limitations by using artificial muscles and other soft actuators. Artificial muscles attempt to mimic the versatility, performance, and reliability of a biological muscle. Some artificial muscles rely on fluidic actuators, but fluidic actuators require a supply of pressurized gas or liquid, and fluid transport must occur through systems of channels and tubes, limiting the speed and efficiency of the artificial muscles. Other artificial muscles use thermally activated polymer fibers, but these are difficult to control and operate at low efficiencies.

Furthermore, various uses of conventional inflation systems are limited by the size and shape of the inflation systems, and thus the degree of inflation. Therefore, additional inflation systems, or inflation systems having a different size and/or shape, may be required for performing other specific tasks.

Accordingly, a need exists for improved inflation systems with a modular structure that can be formed into any suitable shape and size by connecting a plurality of individual inflation segments to one another.

SUMMARY

In one embodiment, an inflation segment includes an inflation enclosure, and a plurality of artificial muscle layers provided within the inflation enclosure in a stacked arrangement, each of the plurality of artificial muscle layers including one or more artificial muscles, wherein the one or more plurality of artificial muscles of each of the plurality of artificial muscle layers are operable between an actuated state and a non-actuated state, and one or more fastening members for attaching the inflation segment to another inflation segment.

In another embodiment, an inflation system includes a plurality of inflation segments, each inflation segment including an inflation enclosure and a plurality of artificial muscle layers provided within the inflation enclosure in a stacked arrangement, each of the plurality of artificial muscle layers including one or more artificial muscles, wherein the one or more plurality of artificial muscles of each of the plurality of artificial muscle layers are operable between an actuated state and a non-actuated state, and one or more fastening members for attaching one or more of the plurality of inflation segments to another of the plurality of inflation segments.

In yet another embodiment, method for actuating an inflation system, the method includes connecting a plurality of inflation segments to one another at adjacent sides, each inflation segment including an inflation enclosure and a plurality of artificial muscle layers provided within the inflation enclosure in a stacked arrangement, each of the plurality of artificial muscle layers including one or more artificial muscles, each artificial muscle including a housing having an electrode region, an expandable fluid region, and an electrode pair positioned in the electrode region of the housing, providing a voltage using a power supply electrically coupled to the electrode pair of each artificial muscle of the plurality of artificial muscle layers, and applying the voltage to the electrode pair of at least one artificial muscle of at least one of the plurality of artificial muscle layers, thereby actuating the electrode pair of the at least one artificial muscle from a non-actuated state to an actuated state.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
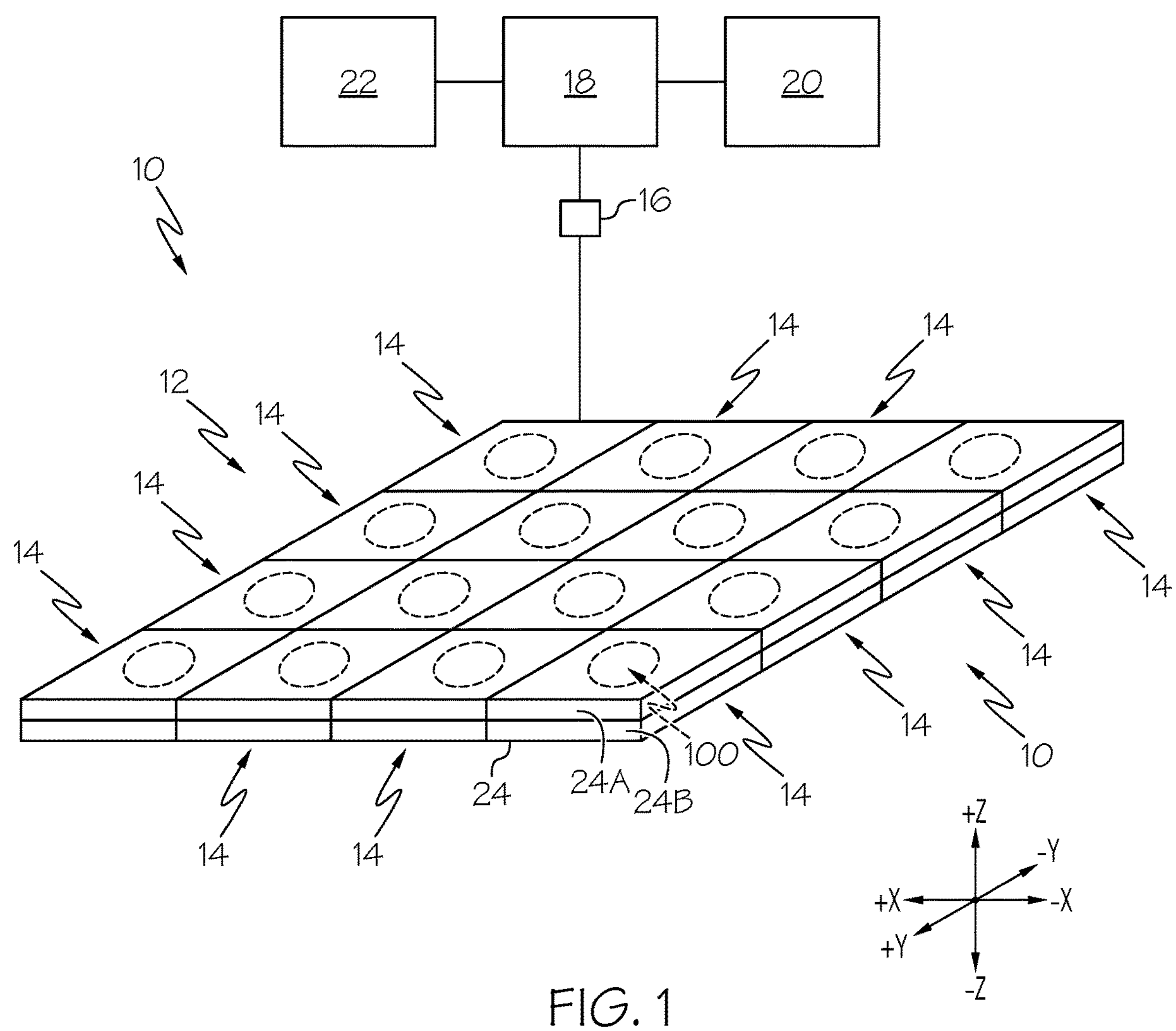
FIG. 1 schematically depicts a top perspective view of an example inflation system including a plurality of inflation segments including one or more artificial muscles, according to one or more embodiments shown and described herein.

Embodiments described herein are directed to inflation systems and inflation segments for forming modular inflation systems. Each inflation segment includes an inflation enclosure and a plurality of artificial muscle layers provided within the inflation enclosure in a stacked arrangement. Each artificial muscle layer includes one or more artificial muscles operable between an actuated state and a non-actuated state. Individual inflation segments of an inflation system are connected to one another by one or more fastening members provided on the inflation enclosure.

Any number of inflation segments may be connected to one another to form an inflation system having any suitable shape and size with the artificial muscles of each inflation segment electrically connected to one another. By permitting a plurality of inflation segments to be connected to one another, inflation systems having any suitable shape and size may be formed. As such, the inflation systems disclosed herein may be used for a variety of purposes such as, for example, a car lift, an inflatable raft, a blanket, and the like. Various embodiments of the modular inflation systems and inflation segments and the operation of the inflation segments are described in more detail herein. Whenever possible, the same reference numerals will be used throughout the drawings to refer to the same or like parts.

Referring now to FIG. 1, an inflation system 10 is illustrated according to one or more embodiments described herein. The inflation system 10 may generally include a modular inflation structure 12 formed by attaching a plurality of inflation segments 14 to one another. As shown, a plurality of inflation segments 14 are attached to one another at adjacent sides to form the illustrated inflation structure 12 having a 4×4 arrangement. However, it should be appreciated that any number of inflation segments 14 may be attached to one another to form an inflation structure other than that illustrated herein having any suitable size. In addition, the inflation segments 14 may have any suitable size and shape such as, for example, rectangular, square, circular, and the like. As shown herein, the inflation segments 14 have a substantially square shape.

As described in more detail herein, each inflation segment 14 includes one or more artificial muscles 100. Although only a single artificial muscle 100 is illustrated in each inflation segment 14, this is not intended to be limiting to the present disclosure and is depicted for illustrative purposes only. The inflation system 10 further includes a connection device 16 such as, for example, a busbar, for electrically connecting each of the inflation segments 14, particularly the artificial muscles 100, to a controller 18 and a power supply 20. The inflation segments 14 may be connected to the connection device 16 in any suitable manner such as, for example, in series or in parallel, so that each inflation segment 14 may receive a charge from the power supply 20 in response to instruction from the controller 18. The power supply 20 may be any suitable power source such as, for example, a battery. More particularly, the battery may be a rechargeable battery including a solar panel. In embodiments, the inflation segments 14 are communicatively coupled to a fluid supply 22 such as, for example, an air pump, for supplying a fluid to each of the inflation segments 14, as discussed in more detail herein. The fluid supply 22 may be powered by the power supply 20 or a separate power source.

Figure 2:
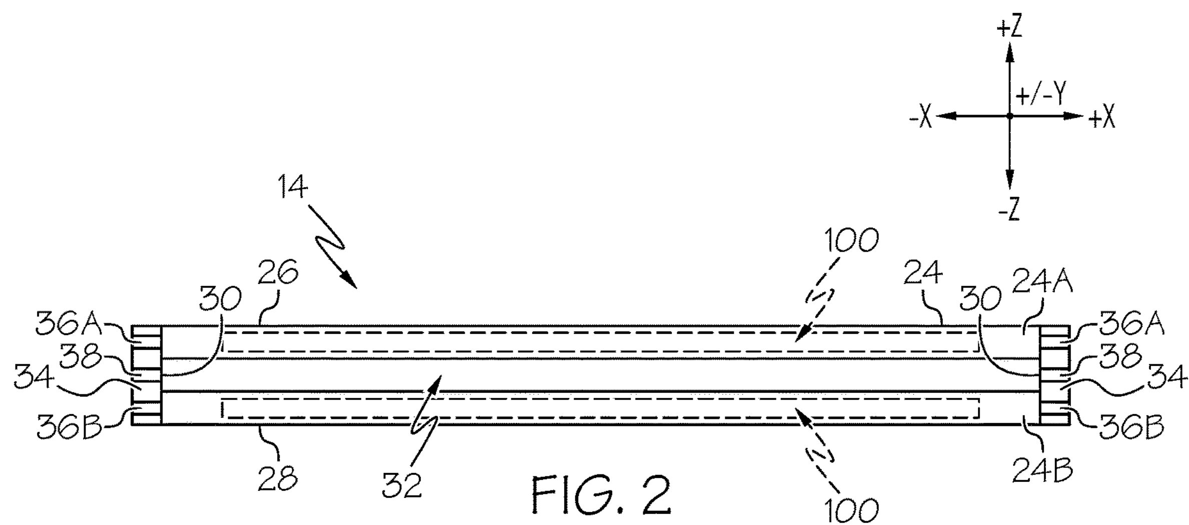
FIG. 2 schematically depicts a side view of the inflation system including an air pocket, according to one or more embodiments shown and described herein.

Referring now to FIG. 2, an individual inflation segment 14 is illustrated. As shown, in embodiments, the inflation segment 14 comprises one or more inflation enclosures 24 in a stacked arrangement. Each of the inflation enclosures 24 comprise one or more of the artificial muscles 100. As shown, the inflation segment 14 comprises a first inflation enclosure 24A and a second inflation enclosure 24B. Although a single artificial muscle 100 is illustrated in each of the first inflation enclosure 24A and the second inflation enclosure 24B, it should be appreciated that a plurality of artificial muscles 100 may be provided, as described in more detail herein.

Referring still to FIG. 2, the inflation segment 14 includes a first outer surface 26, an opposite second outer surface 28, and one or more side walls 30 extending between the first outer surface 26 and the second outer surface 28. In the embodiment illustrated in which the inflation segment 14 includes a first inflation enclosure 24A and a second inflation enclosure 24B, the first inflation enclosure 24A defines the first outer surface 26 and the second inflation enclosure 24B defines the second outer surface 28. In addition, in embodiments in which the inflation segment 14 has a square shape, the inflation segment 14 has a plurality of side walls 30.

As shown in FIG. 2, in embodiments, the side walls 30 extend between the first outer surface 26 and the second outer surface 28 to secure the first inflation enclosure 24A and the second inflation enclosure 24B to one another in a spaced apart manner. This defines an air pocket 32 formed between the first inflation enclosure 24A and the second inflation enclosure 24B that can be operable between an inflated state and a deflated state by receiving fluid from the fluid supply 22 (FIG. 1).

Referring still to FIG. 2, the inflation segment 14 includes one or more fastening members 34 for connecting the inflation segment 14 to one or more adjacent inflations segments 14. In embodiments a fastening member 34 may be provided on one or more of the side walls 30 for connecting the inflation segment 14 to an adjacent inflation segment 14 positioned at the side wall 30 of the inflation segment 14. In embodiments, the fastening members 34 may include zippers, snaps, buttons, clips, magnets, and the like for attaching the inflation segment 14 to an adjacent inflation segment 14. In embodiments, each fastening member 34 has one or more electrical contacts 36 for electrically coupling the artificial muscles 100 in in adjacent inflation segments 14. As shown, a first electrical contact 36A is provided for electrically coupling the artificial muscles 100 in the first inflation enclosure 24A to artificial muscles 100 in a first inflation enclosure 24A of an adjacent inflation segment 14. This eliminates the need for individually electrically connecting each inflation segment 14 to the connection device 16 (FIG. 1). As shown, in embodiments in which the inflation segment 14 includes a first inflation enclosure 24A and a second inflation enclosure 24B, the fastening member 34 includes a second electrical contact 36B for electrically coupling the artificial muscles 100 in the second inflation enclosure 24B to the artificial muscles 100 in a second inflation enclosure 24B of an adjacent inflation segment 14.

In embodiments in which the inflation segment 14 includes the air pocket 32, the fastening member 34 may include a port 38 for placing the air pocket 32 in fluid communication with the fluid supply 22 (FIG. 1), either directly or indirectly via an adjacent inflation segment 14. For example, fluid may flow from the fluid supply 22 and into the air pocket 32 through the port 38 in the fastening member 34, thereby inflating the air pocket 32 of the inflation segment 14. In embodiments, fluid may continue to flow through the air pocket 32 of the inflation segment 14, through a port 38 in another one of the fastening members 34, and into an air pocket 32 of an adjacent inflation segment 14 in the same manner. Thus, only one of the inflation segments 14 are required to be in direct fluid communication with the fluid supply 22.

In embodiments, the inflation segment 14 may include one or more intermediate inflation enclosures 24, not shown, for defining a plurality of air pockets 32 between adjacent inflation enclosures 24. By providing additional air pockets 32, the inflation segment 14 may be capable of further expansion in the direction in which the inflation enclosures 24 are stacked, e.g., along the +/−Z axis in the embodiment illustrated.

Figure 3:
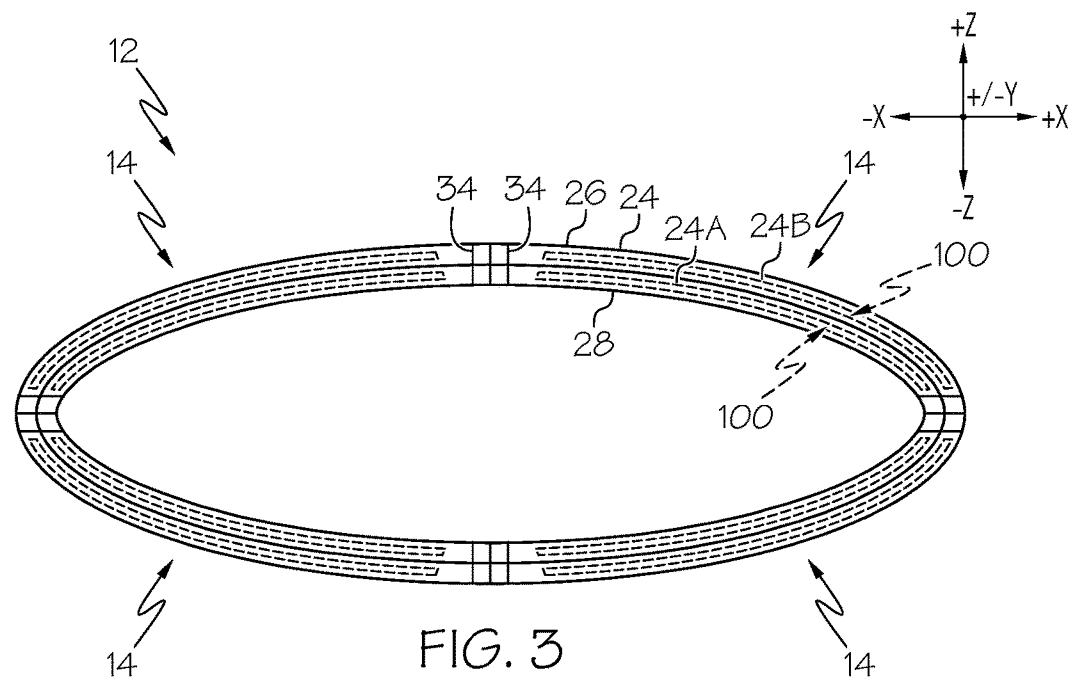
FIG. 3 schematically depicts a side view of the inflation system with inflation segments at opposite ends of the inflation system connected to one another forming a tubular shape, according to one or more embodiments shown and described herein.

Referring now to FIG. 3, an end view of the inflation structure 12 is shown with inflation segments 14 on opposite sides of the inflation structure 12 connected to one another, thereby forming a tubular shape. With the inflation structure 12 folded in this manner, the inflation structure 12 may be utilized as an inflatable sleeve. As a non-limiting example, the inflation structure 12 may be suitable as a sleeping bag or the like. Alternatively, when the inflation structure 12 remains in an unfolded position, such as shown in FIG. 1, the inflation structure 12 may be suitable for a wide variety of purposes such as, for example, an inflatable floating raft. Alternatively, it should be appreciated that the inflation structure 12 may be folded in an accordion style and arranged in a stacked arrangement to function as a car jack or lift by inflating the air pockets 32 and/or actuating the artificial muscles 100.

Figure 4:
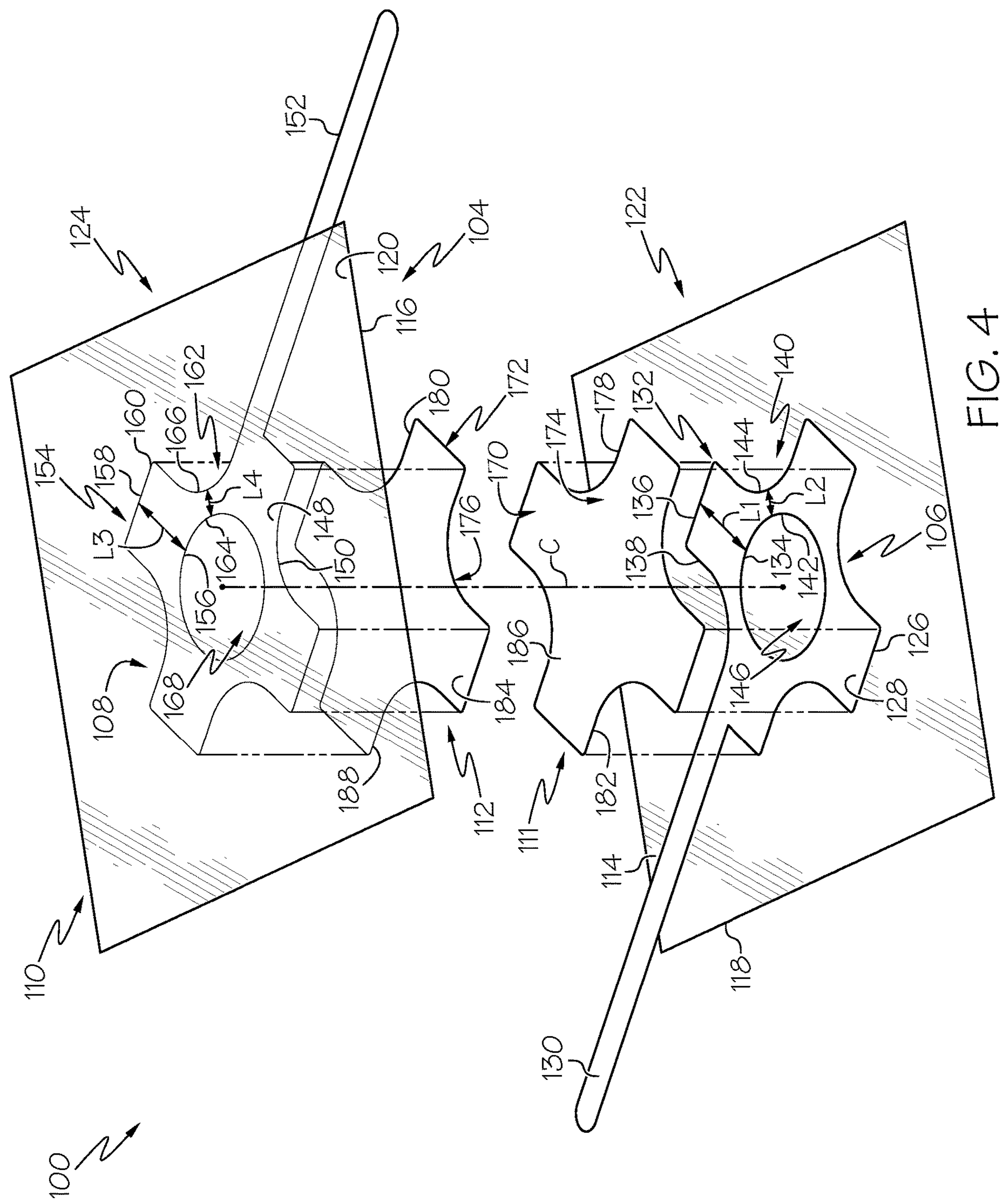
FIG. 4 schematically depicts an exploded view of an example artificial muscle, according to one or more embodiments shown and described herein.
Figure 5:
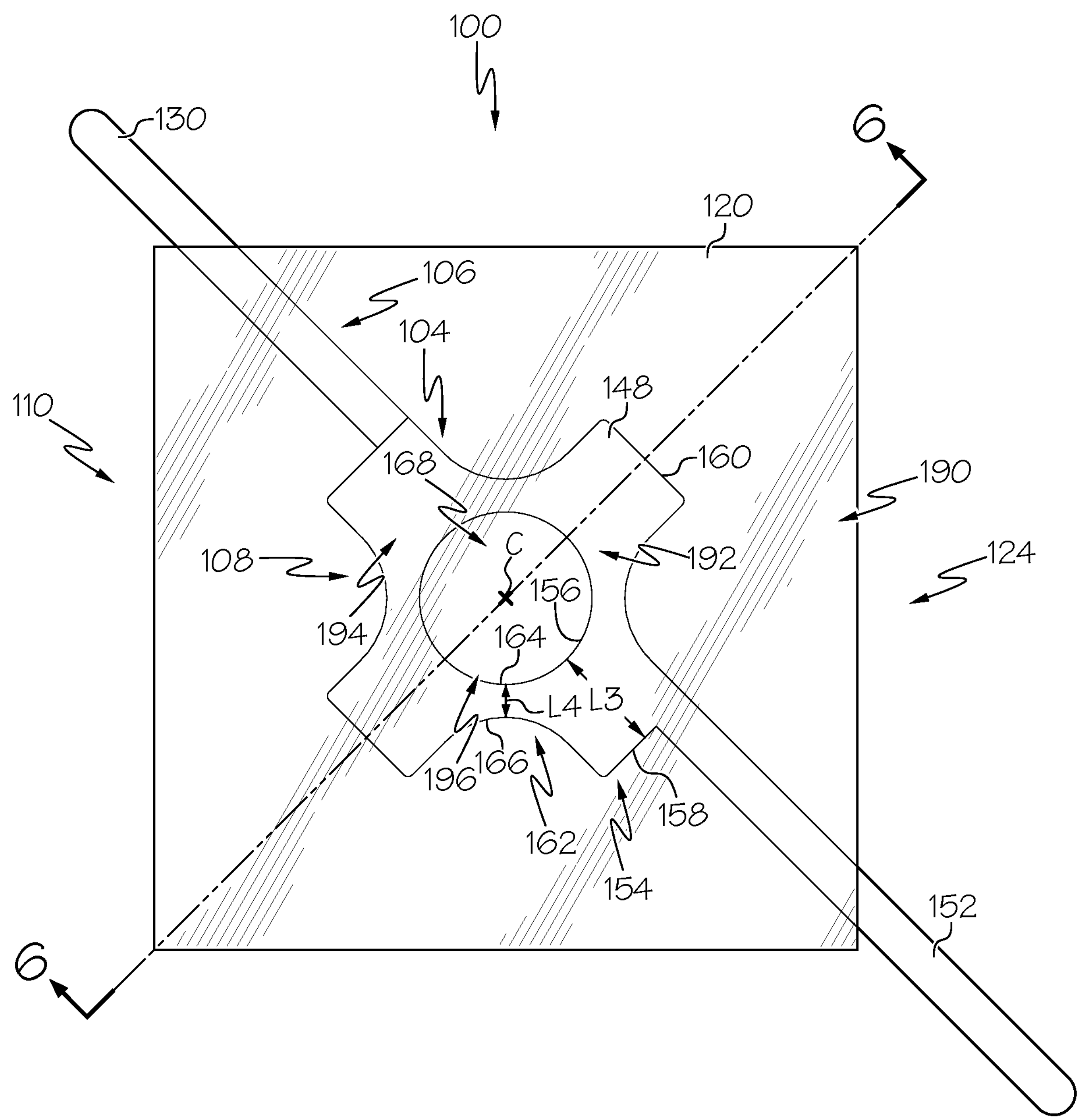
FIG. 5 schematically depicts a top view of the artificial muscle of FIG. 4, according to one or more embodiments shown and described herein.

Referring now to FIGS. 4 and 5, an example artificial muscle 100 that may be disposed in an artificial muscle stack 201 (FIGS. 8A-8E) is schematically depicted. The artificial muscle 100 comprises a housing 110, the electrode pair 104, including a first electrode 106 and a second electrode 108, fixed to opposite surfaces of the housing 110, a first electrical insulator layer 111 fixed to the first electrode 106, and a second electrical insulator layer 112 fixed to the second electrode 108. In some embodiments, the housing 110 is a one-piece monolithic layer including a pair of opposite inner surfaces, such as a first inner surface 114 and a second inner surface 116, and a pair of opposite outer surfaces, such as a first outer surface 118 and a second outer surface 120. In some embodiments, the first inner surface 114 and the second inner surface 116 of the housing 110 are heat-sealable. In other embodiments, the housing 110 may be a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120.

While the embodiments described herein primarily refer to the housing 110 as comprising the first film layer 122 and the second film layer 124, as opposed to the one-piece housing 110, it should be understood that either arrangement is contemplated. In some embodiments, the first film layer 122 and the second film layer 124 generally include the same structure and composition. For example, in some embodiments, the first film layer 122 and the second film layer 124 each comprises biaxially oriented polypropylene.

The first electrode 106 and the second electrode 108 are each positioned between the first film layer 122 and the second film layer 124. In some embodiments, the first electrode 106 and the second electrode 108 are each aluminum-coated polyester such as, for example, Mylar®. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 100 is negatively charged.

Figure 9:
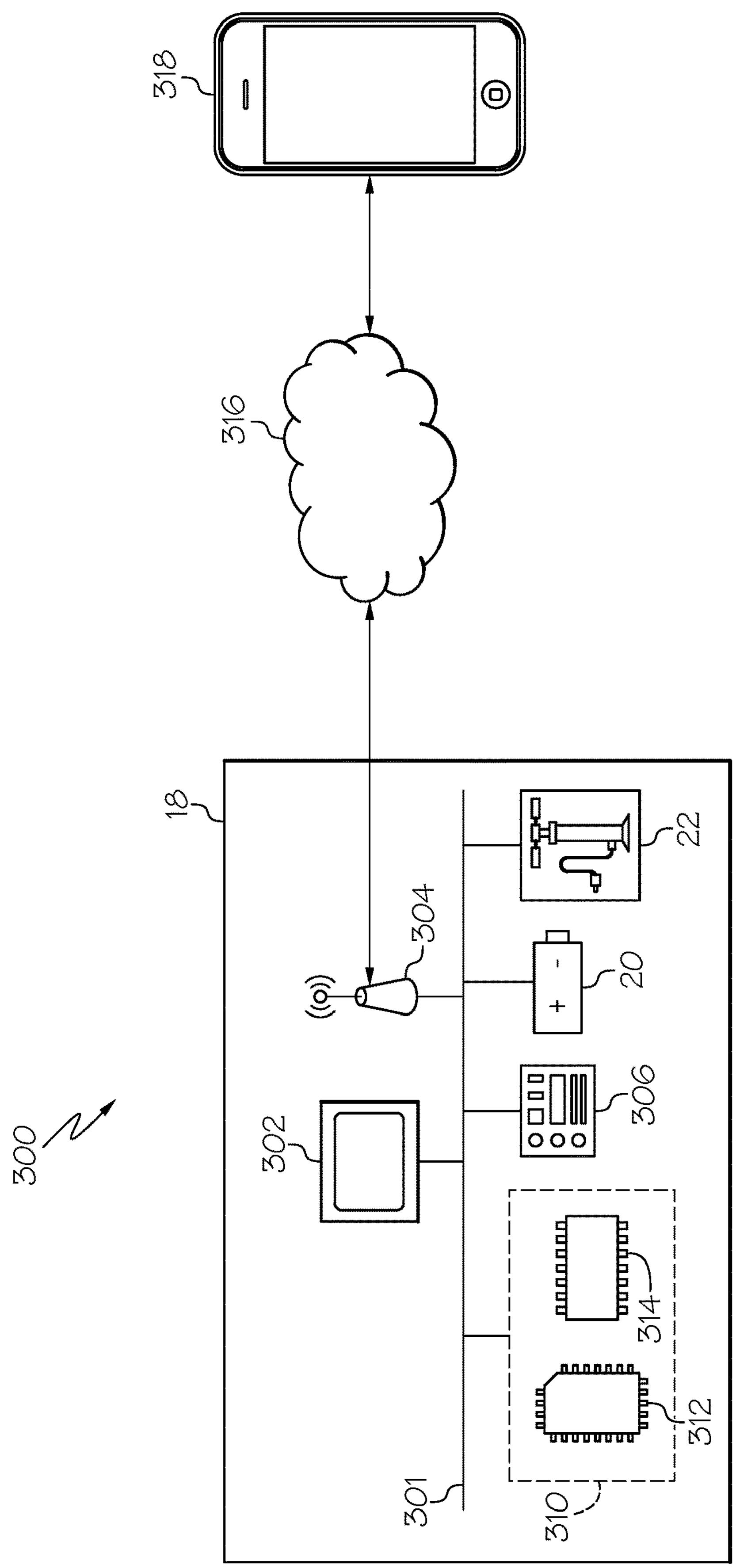
FIG. 9 schematically depicts an actuation system for operating the inflation system of FIG. 1, according to one or more embodiments shown and described herein.

The first electrode 106 has a film-facing surface 126 and an opposite inner surface 128. The first electrode 106 is positioned against the first film layer 122, specifically, the first inner surface 114 of the first film layer 122. In addition, the first electrode 106 includes a first terminal 130 extending from the first electrode 106 past an edge of the first film layer 122 such that the first terminal 130 can be connected to a power supply to supply a charge to the first electrode 106. Specifically, the terminal 130 is coupled, either directly or in series, to a power supply and a controller, such as the power supply 20 and the controller 18, of an actuation system 300, as shown in FIG. 9. Similarly, the second electrode 108 has a film-facing surface 148 and an opposite inner surface 150. The second electrode 108 is positioned against the second film layer 124, specifically, the second inner surface 116 of the second film layer 124. The second electrode 108 includes a second terminal 152 extending from the second electrode 108 past an edge of the second film layer 124 such that the second terminal 152 can be connected to a power supply and a controller of the actuation system 300 to supply a charge to the second electrode 108.

The first electrode 106 includes two or more tab portions 132 and two or more bridge portions 140. Each bridge portion 140 is positioned between adjacent tab portions 132, interconnecting these adjacent tab portions 132. Each tab portion 132 has a first end 134 extending radially from a center axis C of the first electrode 106 to an opposite second end 136 of the tab portion 132, where the second end 136 defines a portion of an outer perimeter 138 of the first electrode 106. Each bridge portion 140 has a first end 142 extending radially from the center axis C of the first electrode 106 to an opposite second end 144 of the bridge portion 140 defining another portion of the outer perimeter 138 of the first electrode 106. Each tab portion 132 has a tab length L1 and each bridge portion 140 has a bridge length L2 extending in a radial direction from the center axis C of the first electrode 106. The tab length L1 is a distance from the first end 134 to the second end 136 of the tab portion 132 and the bridge length L2 is a distance from the first end 142 to the second end 144 of the bridge portion 140. The tab length L1 of each tab portion 132 is longer than the bridge length L2 of each bridge portion 140. In some embodiments, the bridge length L2 is 20% to 50% of the tab length L1, such as 30% to 40% of the tab length L1.

In some embodiments, the two or more tab portions 132 are arranged in one or more pairs of tab portions 132. Each pair of tab portions 132 includes two tab portions 132 arranged diametrically opposed to one another. In some embodiments, the first electrode 106 may include only two tab portions 132 positioned on opposite sides or ends of the first electrode 106. In some embodiments, as shown in FIG. 4, the first electrode 106 includes four tab portions 132 and four bridge portions 140 interconnecting adjacent tab portions 132. In this embodiment, the four tab portion 132 are arranged as two pairs of tab portions 132 diametrically opposed to one another. Furthermore, as shown, the first terminal 130 extends from the second end 136 of one of the tab portions 132 and is integrally formed therewith.

Like the first electrode 106, the second electrode 108 includes at least a pair of tab portions 154 and two or more bridge portions 162. Each bridge portion 162 is positioned between adjacent tab portions 154, interconnecting these adjacent tab portions 154. Each tab portion 154 has a first end 156 extending radially from a center axis C of the second electrode 108 to an opposite second end 158 of the tab portion 154, where the second end 158 defines a portion of an outer perimeter 160 of the second electrode 108. Due to the first electrode 106 and the second electrode 108 being coaxial with one another, the center axis C of the first electrode 106 and the second electrode 108 are the same. Each bridge portion 162 has a first end 164 extending radially from the center axis C of the second electrode 108 to an opposite second end 166 of the bridge portion 162 defining another portion of the outer perimeter 160 of the second electrode 108. Each tab portion 154 has a tab length L3 and each bridge portion 162 has a bridge length L4 extending in a radial direction from the center axis C of the second electrode 108. The tab length L3 is a distance from the first end 156 to the second end 158 of the tab portion 154 and the bridge length L4 is a distance from the first end 164 to the second end 166 of the bridge portion 162. The tab length L3 is longer than the bridge length L4 of each bridge portion 162. In some embodiments, the bridge length L4 is 20% to 50% of the tab length L3, such as 30% to 40% of the tab length L3.

In some embodiments, the two or more tab portions 154 are arranged in one or more pairs of tab portions 154. Each pair of tab portions 154 includes two tab portions 154 arranged diametrically opposed to one another. In some embodiments, the second electrode 108 may include only two tab portions 154 positioned on opposite sides or ends of the first electrode 106. In some embodiments, as shown in FIGS. 4 and 5, the second electrode 108 includes four tab portions 154 and four bridge portions 162 interconnecting adjacent tab portions 154. In this embodiment, the four tab portions 154 are arranged as two pairs of tab portions 154 diametrically opposed to one another. Furthermore, as shown, the second terminal 152 extends from the second end 158 of one of the tab portions 154 and is integrally formed therewith.

Figures 6A, 6B:
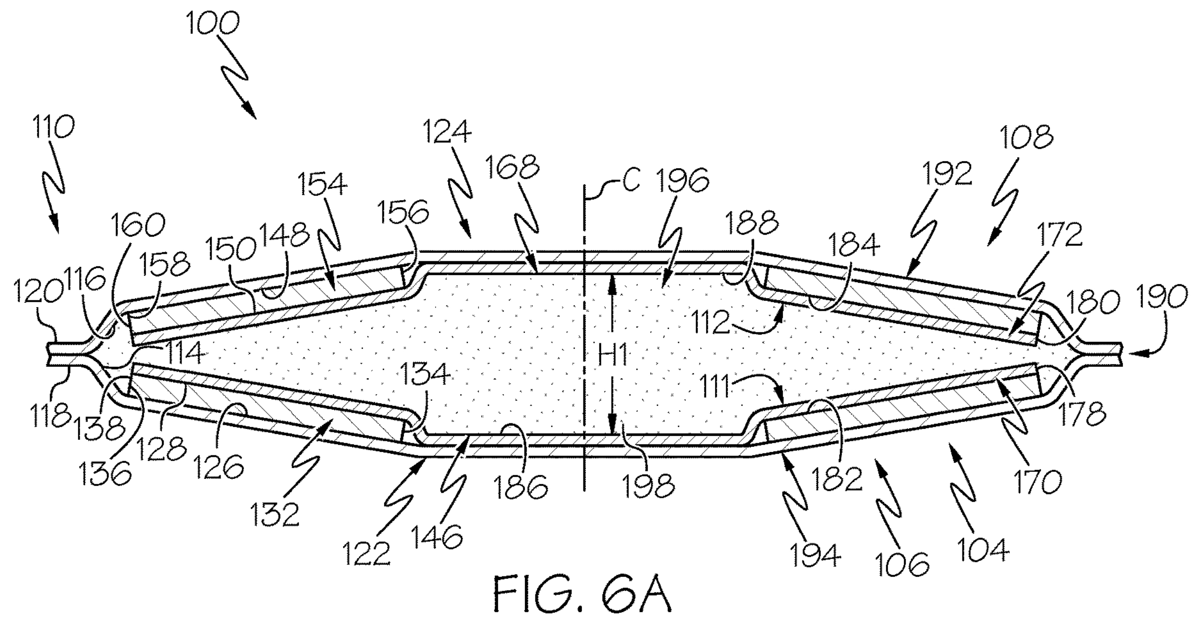
FIG. 6A schematically depicts a cross-sectional view of the artificial muscle of FIG. 5 taken along line 6-6 in FIG. 5 in a non-actuated state, according to one or more embodiments shown and described herein.
FIG. 6B schematically depicts a cross-sectional view of the artificial muscle of FIG. 5 taken along line 6-6 in FIG. 5 in an actuated state, according to one or more embodiments shown and described herein.
Figure 7A:
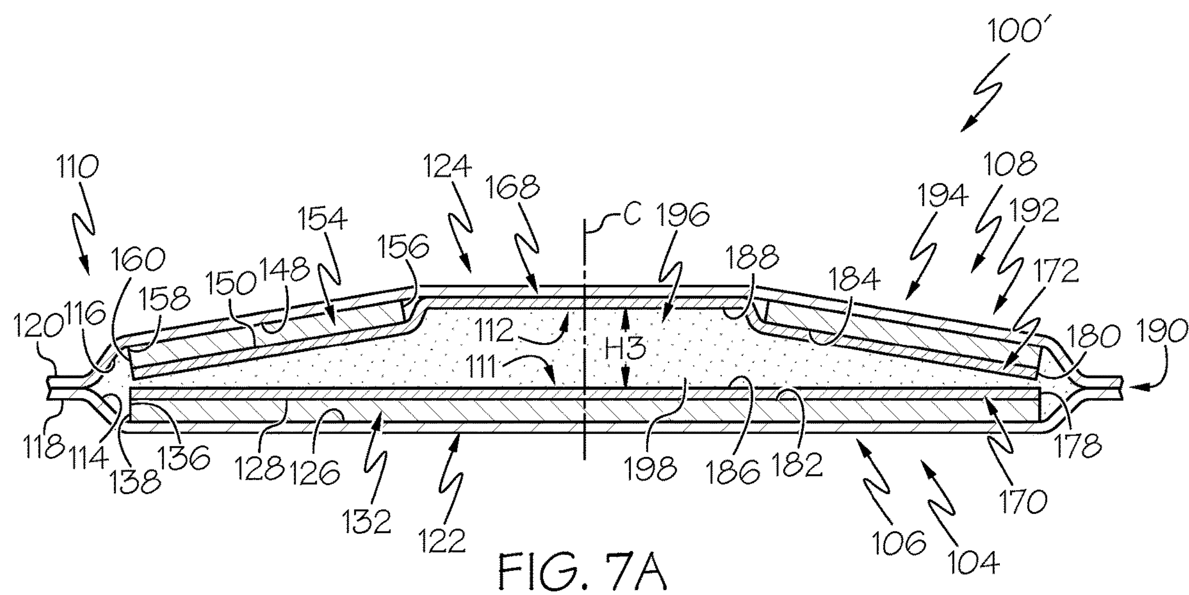
FIG. 7A schematically depicts a cross-sectional view of another example artificial muscle in a non-actuated state, according to one or more embodiments shown and described herein.
Figure 7B:
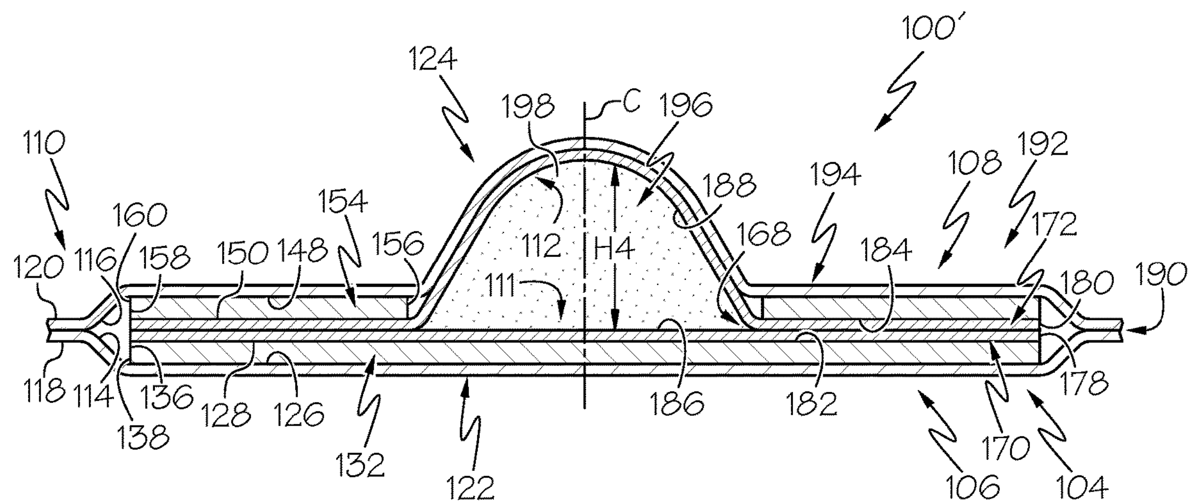
FIG. 7B schematically depicts a cross-sectional view of the artificial muscle of FIG. 7A in an actuated state, according to one or more embodiments shown and described herein.

Referring now to FIGS. 4-6B, at least one of the first electrode 106 and the second electrode 108 has a central opening 146, 168 formed therein between the first end 134, 156 of the tab portions 132, 154 and the first end 142, 164 of the bridge portions 140, 162. In FIGS. 6A and 6B, the first electrode 106 has a central opening 146. However, it should be understood that the first electrode 106 does not need to include the central opening 146 when the central opening 168 is provided within the second electrode 108, as shown in FIGS. 7A and 7B. Alternatively, the second electrode 108 does not need to include the central opening 168 when the central opening 146 is provided within the first electrode 106. Referring still to FIG. 4, the first electrical insulator layer 111 and the second electrical insulator layer 112 have a geometry generally corresponding to the first electrode 106 and the second electrode 108, respectively. Thus, the first electrical insulator layer 111 and the second electrical insulator layer 112 each have tab portions 170, 172 and bridge portions 174, 176 corresponding to like portions on the first electrode 106 and the second electrode 108. Further, the first electrical insulator layer 111 and the second electrical insulator layer 112 each have an outer perimeter 178, 180 corresponding to the outer perimeter 138 of the first electrode 106 and the outer perimeter 160 of the second electrode 108, respectively, when positioned thereon.

It should be appreciated that, in some embodiments, the first electrical insulator layer 111 and the second electrical insulator layer 112 generally include the same structure and composition. As such, in some embodiments, the first electrical insulator layer 111 and the second electrical insulator layer 112 each include an adhesive surface 182, 184 and an opposite non-sealable surface 186, 188, respectively. Thus, in some embodiments, the first electrical insulator layer 111 and the second electrical insulator layer 112 are each a polymer tape adhered to the inner surface 128 of the first electrode 106 and the inner surface 150 of the second electrode 108, respectively.

Referring now to FIGS. 5-6B, the artificial muscle 100 is shown in its assembled form with the first terminal 130 of the first electrode 106 and the second terminal 152 of the second electrode 108 extending past an outer perimeter of the housing 110, i.e., the first film layer 122 and the second film layer 124. As shown in FIG. 5, the second electrode 108 is stacked on top of the first electrode 106 and, therefore, the first electrode 106, the first film layer 122, and the second film layer 124 are not shown. In its assembled form, the first electrode 106, the second electrode 108, the first electrical insulator layer 111, and the second electrical insulator layer 112 are sandwiched between the first film layer 122 and the second film layer 124. The first film layer 122 is partially sealed to the second film layer 124 at an area surrounding the outer perimeter 138 of the first electrode 106 and the outer perimeter 160 of the second electrode 108. In some embodiments, the first film layer 122 is heat-sealed to the second film layer 124. Specifically, in some embodiments, the first film layer 122 is sealed to the second film layer 124 to define a sealed portion 190 surrounding the first electrode 106 and the second electrode 108. The first film layer 122 and the second film layer 124 may be sealed in any suitable manner, such as using an adhesive, heat sealing, vacuum sealing, or the like.

The first electrode 106, the second electrode 108, the first electrical insulator layer 111, and the second electrical insulator layer 112 provide a barrier that prevents the first film layer 122 from sealing to the second film layer 124 forming an unsealed portion 192. The unsealed portion 192 of the housing 110 includes the electrode region 194, in which the electrode pair 104 is provided, and the expandable fluid region 196, which is surrounded by the electrode region 194. The central openings 146, 168 of the first electrode 106 and the second electrode 108 form the expandable fluid region 196 and are arranged to be axially stacked on one another. Although not shown, the housing 110 may be cut to conform to the geometry of the electrode pair 104 and reduce the size of the artificial muscle 100, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 100 using a needle or other suitable injection device.

Referring now to FIGS. 6A and 6B, the artificial muscle 100 is actuatable between a non-actuated state and an actuated state. In the non-actuated state, as shown in FIG. 6A, the first electrode 106 and the second electrode 108 are partially spaced apart from one another proximate the central openings 146, 168 thereof and the first end 134, 156 of the tab portions 132, 154. The second end 136, 158 of the tab portions 132, 154 remain in position relative to one another due to the housing 110 being sealed at the outer perimeter 138 of the first electrode 106 and the outer perimeter 160 of the second electrode 108. In the actuated state, as shown in FIG. 6B, the first electrode 106 and the second electrode 108 are brought into contact with and oriented parallel to one another to force the dielectric fluid 198 into the expandable fluid region 196. This causes the dielectric fluid 198 to flow through the central openings 146, 168 of the first electrode 106 and the second electrode 108 and inflate the expandable fluid region 196.

Referring now to FIG. 6A, the artificial muscle 100 is shown in the non-actuated state. The electrode pair 104 is provided within the electrode region 194 of the unsealed portion 192 of the housing 110. The central opening 146 of the first electrode 106 and the central opening 168 of the second electrode 108 are coaxially aligned within the expandable fluid region 196. In the non-actuated state, the first electrode 106 and the second electrode 108 are partially spaced apart from and non-parallel to one another. Due to the first film layer 122 being sealed to the second film layer 124 around the electrode pair 104, the second end 136, 158 of the tab portions 132, 154 are brought into contact with one another. Thus, dielectric fluid 198 is provided between the first electrode 106 and the second electrode 108, thereby separating the first end 134, 156 of the tab portions 132, 154 proximate the expandable fluid region 196. Stated another way, a distance between the first end 134 of the tab portion 132 of the first electrode 106 and the first end 156 of the tab portion 154 of the second electrode 108 is greater than a distance between the second end 136 of the tab portion 132 of the first electrode 106 and the second end 158 of the tab portion 154 of the second electrode 108. This results in the electrode pair 104 zippering toward the expandable fluid region 196 when actuated. In some embodiments, the first electrode 106 and the second electrode 108 may be flexible. Thus, as shown in FIG. 6A, the first electrode 106 and the second electrode 108 are convex such that the second ends 136, 158 of the tab portions 132, 154 thereof may remain close to one another, but spaced apart from one another proximate the central openings 146, 168. In the non-actuated state, the expandable fluid region 196 has a first height H1.

When actuated, as shown in FIG. 6B, the first electrode 106 and the second electrode 108 zipper toward one another from the second ends 144, 158 of the tab portions 132, 154 thereof, thereby pushing the dielectric fluid 198 into the expandable fluid region 196. As shown, when in the actuated state, the first electrode 106 and the second electrode 108 are parallel to one another. In the actuated state, the dielectric fluid 198 flows into the expandable fluid region 196 to inflate the expandable fluid region 196. As such, the first film layer 122 and the second film layer 124 expand in opposite directions. In the actuated state, the expandable fluid region 196 has a second height H2, which is greater than the first height H1 of the expandable fluid region 196 when in the non-actuated state. Although not shown, it should be noted that the electrode pair 104 may be partially actuated to a position between the non-actuated state and the actuated state. This would allow for partial inflation of the expandable fluid region 196 and adjustments when necessary.

To move the first electrode 106 and the second electrode 108 toward one another, a voltage is applied by a power supply (such as power supply 20 of FIG. 1). In some embodiments, a voltage of up to 10 kV may be provided from the power supply to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the first film layer 122 and the first electrical insulator layer 111 to deform in a first axial direction along the center axis C of the first electrode 106 and causes the second film layer 124 and the second electrical insulator layer 112 to deform in an opposite second axial direction along the center axis C of the second electrode 108. Once the voltage being supplied to the first electrode 106 and the second electrode 108 is discontinued, the first electrode 106 and the second electrode 108 return to their initial, non-parallel position in the non-actuated state. In operation, a voltage may be applied to one or multiple artificial muscles 100 of the artificial muscle stack 201 of FIGS. 8A-8E to collectively and/or selectively actuate the artificial muscles 100 of the artificial muscle stack 201.

It should be appreciated that the present embodiments of the artificial muscle 100 disclosed herein, specifically, the tab portions 132, 154 with the interconnecting bridge portions 174, 176, provide a number of improvements over actuators that do not include the tab portions 132, 154, such as hydraulically amplified self-healing electrostatic (HASEL) actuators described in the paper titled "*Hydraulically amplified self-healing electrostatic actuators with muscle-like performance*" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). Embodiments of the artificial muscle 100 including two pairs of tab portions 132, 154 on each of the first electrode 106 and the second electrode 108, respectively, reduces the overall mass and thickness of the artificial muscle 100, reduces the amount of voltage required during actuation, and decreases the total volume of the artificial muscle 101 without reducing the amount of resulting force after actuation as compared to known HASEL actuators including donut-shaped electrodes having a uniform, radially-extending width. More particularly, the tab portions 132, 154 of the artificial muscle 100 provide zipping fronts that result in increased actuation power by providing localized and uniform hydraulic actuation of the artificial muscle 100 compared to HASEL actuators including donut-shaped electrodes. Specifically, one pair of tab portions 132, 154 provides twice the amount of actuator power per unit volume as compared to donut-shaped HASEL actuators, while two pairs of tab portions 132, 154 provide four times the amount of actuator power per unit volume. The bridge portions 174, 176 interconnecting the tab portions 132, 154 also limit buckling of the tab portions 132, 154 by maintaining the distance between adjacent tab portions 132, 154 during actuation. Because the bridge portions 174, 176 are integrally formed with the tab portions 132, 154, the bridge portions 174, 176 also prevent leakage between the tab portions 132, 154 by eliminating attachment locations that provide an increased risk of rupturing.

In operation, when the artificial muscle 100 is actuated by providing a voltage and applying the voltage to the electrode pair 104 of the artificial muscle 100, expansion of the expandable fluid region 196 produces a force of 3 Newton-millimeters (N·mm) per cubic centimeter ($cm^3$) of actuator volume or greater, such as 4 N·mm per $cm^3$ or greater, 5 N·mm per $cm^3$ or greater, 6 N·mm per $cm^3$ or greater, 7 N·mm per $cm^3$ or greater, 8 N·mm per $cm^3$ or greater, or the like. Providing the voltage may comprise generating the voltage, for example, in an embodiment in which the power supply 20 (FIG. 1) is a battery, converting the voltage, for example in an embodiment in which the power supply 20 (FIG. 1) is a power adaptor, or any other known or yet to be developed technique for readying a voltage for application. In one example, when the artificial muscle 100 is actuated by a voltage of 9.5 kilovolts (kV), the artificial muscle 100 provides a resulting force of 5 N. In another example, when the artificial muscle 100 is actuated by a voltage of 10 kV the artificial muscle 100 provides 440% strain under a 500 gram load.

Moreover, the size of the first electrode 106 and the second electrode 108 is proportional to the amount of displacement of the dielectric fluid 198. Therefore, when greater displacement within the expandable fluid region 196 is desired, the size of the electrode pair 104 is increased relative to the size of the expandable fluid region 196. It should be appreciated that the size of the expandable fluid region 196 is defined by the central openings 146, 168 in the first electrode 106 and the second electrode 108. Thus, the degree of displacement within the expandable fluid region 196 may alternatively, or in addition, be controlled by increasing or reducing the size of the central openings 146, 168.

As shown in FIGS. 7A and 7B, another embodiment of an artificial muscle 100' is illustrated. The artificial muscle 100' is substantially similar to the artificial muscle 100. As such, like structure is indicated with like reference numerals. However, as shown, the first electrode 106 does not include the central opening 146. Thus, only the second electrode 108 includes the central opening 168 formed therein. As shown in FIG. 7A, the artificial muscle 100' is in the non-actuated state with the first electrode 106 being planar and the second electrode 108 being convex relative to the first electrode 106. In the non-actuated state, the expandable fluid region 196 has a first height H3. In the actuated state, as shown in FIG. 7B, the expandable fluid region 196 has a second height H4, which is greater than the first height H3. It should be appreciated that by providing the central opening 168 only in the second electrode 108 as opposed to both the first electrode 106 and the second electrode 108, the total deformation may be formed on one side of the artificial muscle 100'. In addition, because the total deformation is formed on only one side of the artificial muscle 100', the second height H4 of the expandable fluid region 196 of the artificial muscle 100' extends further from a longitudinal axis perpendicular to the central axis C of the artificial muscle 100' than the second height H2 of the expandable fluid region 196 of the artificial muscle 100 when all other dimensions, orientations, and volume of dielectric fluid are the same.

Referring now to FIGS. 8A-8E, an individual inflation segment 14 including an artificial muscle stack 201 within an inflation enclosure 24 is depicted. The artificial muscle stack 201 comprises a plurality of artificial muscle layers 210 and each of the plurality of artificial muscle layers 210 comprise one of more artificial muscles 100. In some embodiments, the plurality of artificial muscle layers 210 may alternatively or additionally comprise the artificial muscles 100' of FIGS. 7A and 7B). In operation, the artificial muscle stack 201 generates more actuation force than a single artificial muscle 100. It should be appreciated that the present disclosure is not limiting to the specific arrangement of artificial muscles 100 in the artificial muscle stack 201 depicted herein.

Figure 8A:
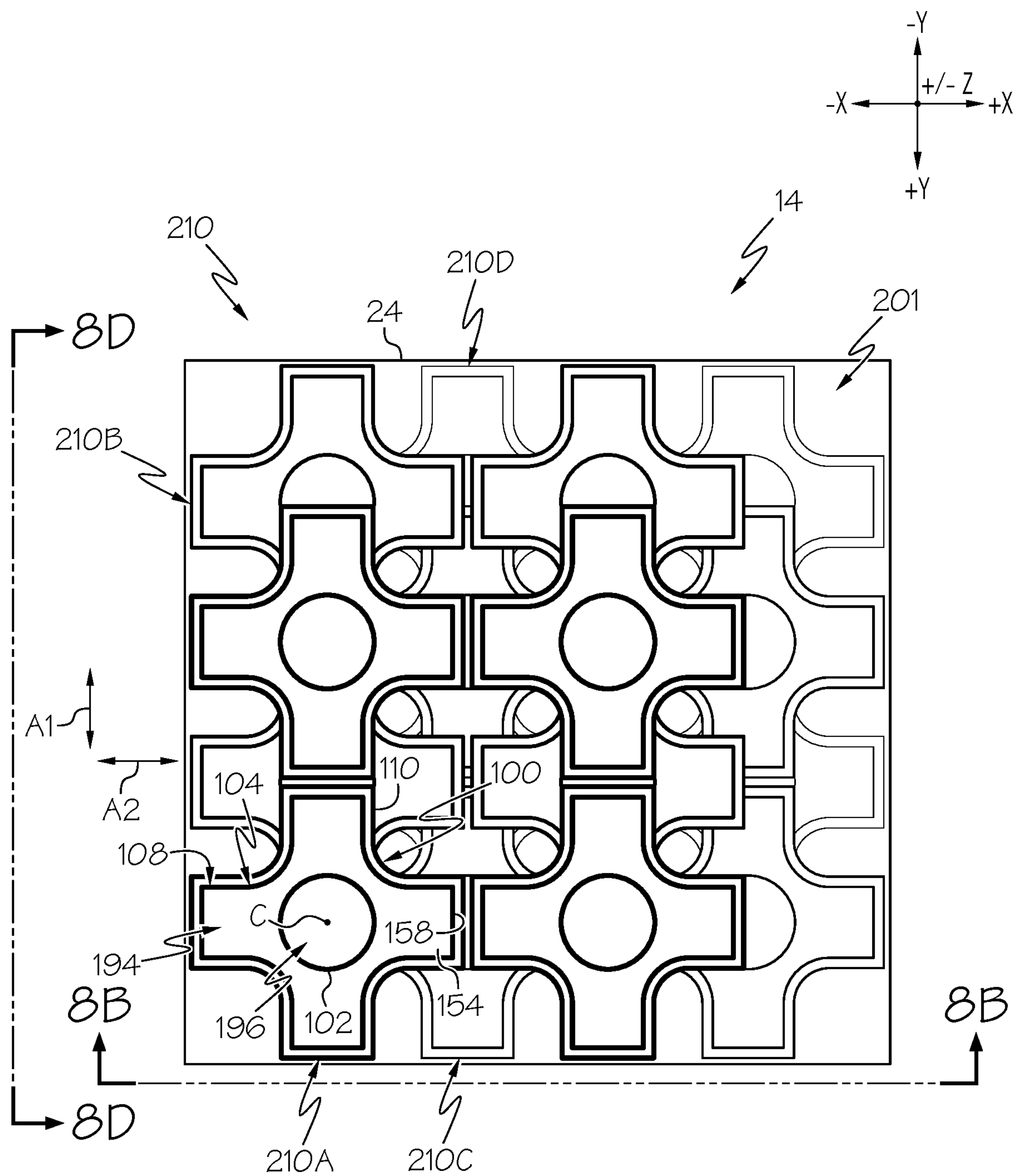
FIG. 8A schematically depicts a top view of an example stack including a plurality of artificial muscle layers positioned in an alternatingly offset arrangement, according to one or more embodiments shown and described herein.
Figure 8B:
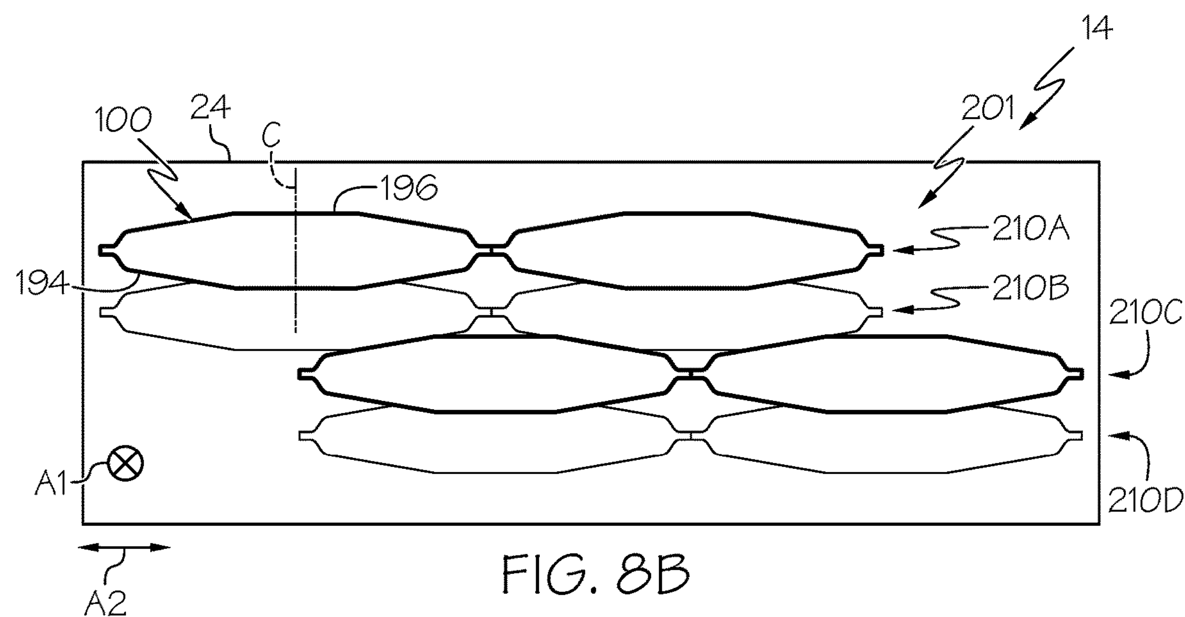
FIG. 8B schematically depicts a side view of the artificial muscle stack of FIG. 8A along line 8B-8B in a non-actuated state, according to one or more embodiments shown and described herein.
Figure 8C:
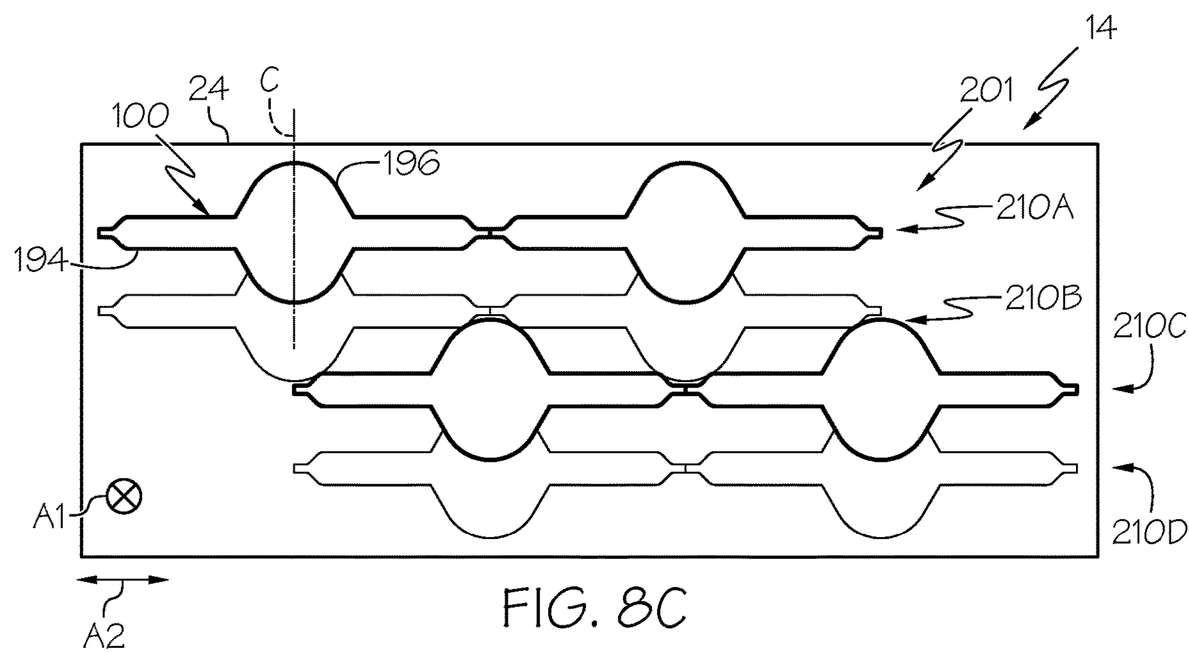
FIG. 8C schematically depicts schematically depicts a side view of the artificial muscle stack of FIG. 8A along line 8B-8B in an actuated state, according to one or more embodiments shown and described herein.
Figure 8D:
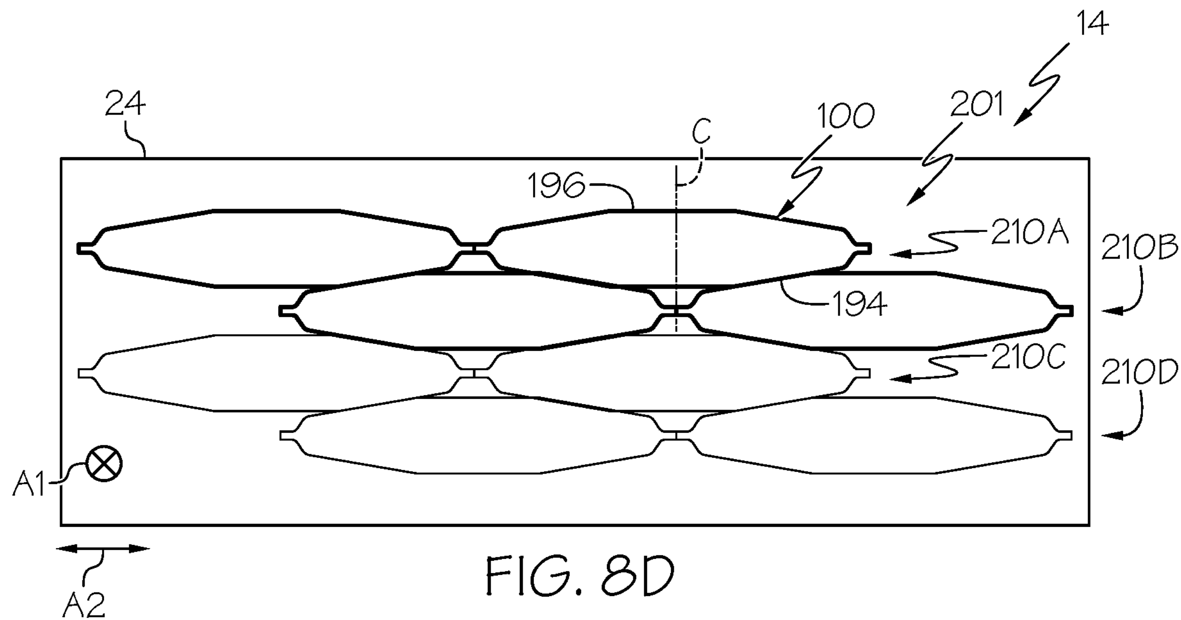
FIG. 8D schematically depicts a side view of the artificial muscle stack of FIG. 8A along line 8D-8D in a non-actuated state, according to one or more embodiments shown and described herein.
Figure 8E:
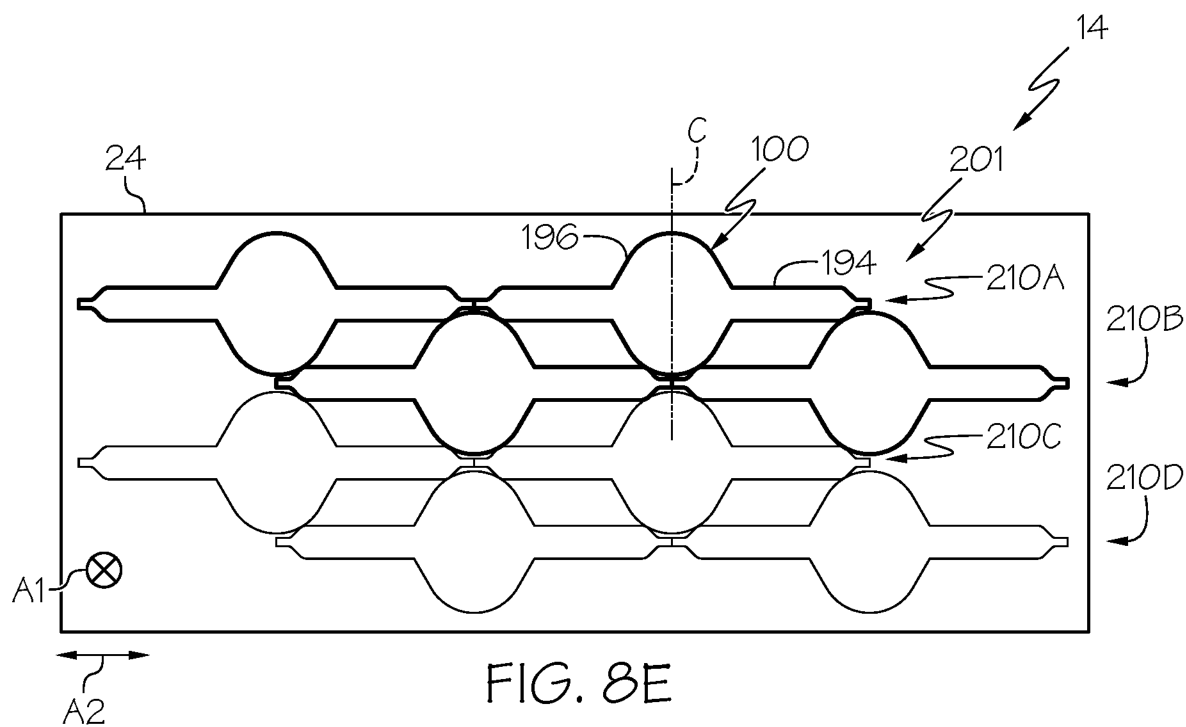
FIG. 8E schematically depicts a side view of the artificial muscle stack of FIG. 8A along line 8D-8D in an actuated state, according to one or more embodiments shown and described herein.

The artificial muscle stack 201 of FIGS. 8A-8E, comprises a plurality of artificial muscle layers 210 arranged in an alternatingly offset arrangement. The artificial muscle stack 201 comprises four artificial muscle layers 210, a first artificial muscle layer 210A, a second artificial muscle layer 210B, a third artificial muscle layer 210C, and a fourth artificial muscle layer 210D. FIG. 8A is a top view of the artificial muscle stack 201 and FIGS. 8B-8E are side views of the artificial muscle stack 201. FIGS. 8B and 8C show a side view of the artificial muscle stack 201 along line 8B-8B in a non-actuated state (FIG. 8B) and in an actuated state (FIG. 8C). FIGS. 8D and 8E show a side view of the artificial muscle stack 201 along line 8D-8D in a non-actuated state (FIG. 8D) and in an actuated state (FIG. 8E). Line 8B-8B is orthogonal to line 8D-8D and thus FIGS. 8B and 8C show a different side of the artificial muscle stack 201 than FIGS. 8D and 8E, and the side shown by FIGS. 8B and 8C is orthogonal to the side shown by FIGS. 8D and 8E.

Each artificial muscle layer 210 comprises one or more artificial muscles 100, for example, a plurality of artificial muscles 100. It should be understood that embodiments are contemplated in which some of the artificial muscle layers 210 of the artificial muscle stack 201 comprises a single artificial muscle 100. In an alternating offset arrangement of the artificial muscle stack 201 depicted in FIGS. 8A-8E, the plurality of artificial muscle layers 210 are arranged such that each expandable fluid region 196 of the housing 110 of the one or more artificial muscles 100 of each artificial muscle layer 210 overlaps at least one tab portion 132, 154 of one or more artificial muscles 100 of an adjacent artificial muscle layer 210. In other words, each expandable fluid region 196 of the housing 110 of the one or more artificial muscles 100 of each artificial muscle layer 210 overlaps the electrode region 194 of the housing 110 of one or more artificial muscles 100 of an adjacent artificial muscle layer 210. In some embodiments, an individual tab portion 132, 154 of one artificial muscle 100 may overlap the expandable fluid region 196 of an artificial muscle 100 in an adjacent artificial muscle layer 210 such that the second end 136, 158 of the individual tab portion 132, 154 terminates at or near the center axis C of the expandable fluid region 196 of the artificial muscle 100 in the adjacent muscle layer 210. Thus, some of the expandable fluid regions 196 may be overlapped by two tab portions 132, 154, each from a different artificial muscle 100, on one or both sides of the expandable fluid region 196. The tab portions 154 of the second electrode 108 of the electrode pair 104 are shown in FIG. 8A but it should be understood that the electrode pair 104 also includes the first electrode 106 with tab portions 132.

To illustrate the alternatingly offset arrangement of the artificial muscle stack 201 in FIGS. 8A-8E, relative line thickness of the artificial muscles 100 of each artificial muscle layer 210 is used to illustrate a relative spatial positioning of the respective artificial muscle layers 210. For example, in FIG. 8A, the first artificial muscle layer 210A is the top layer, so the artificial muscles 100 of the first artificial muscle layer 210A are depicted with the widest line thickness of the plurality of artificial muscle layers 210. Similarly, in FIG. 8A, the fourth artificial muscle layer 210D is the bottom layer, so the artificial muscles 100 of the fourth artificial muscle layer 210D are depicted with the narrowest line thickness of the plurality artificial muscle layers 210.

In the alternatingly offset arrangement of the artificial muscle stack 201, adjacent artificial muscle layers 210 of the artificial muscle stack 201 are offset from one another along one or more tab axes, such as a first tab axis A1 extending parallel to the Y axis of the coordinate axes or a second tab axis A2 extending parallel to the X axis of the coordinate axes. Each tab axis A1, A2 extends from a center axis C of the expandable fluid region 196 of an individual artificial muscle 100 of the plurality of artificial muscle layers 210 to an end (i.e., the second end 136, 158) of at least one of the tab portions 132, 154 of the individual artificial muscle 100 of the plurality of artificial muscle layers 210. As the embodiments of the artificial muscles 100 of the artificial muscle stack 201 depicted in FIGS. 8A-8E each comprise four tab portions 132, 154 arranged in diametrically opposed pairs, the first tab axis A1 is orthogonal the second tab axis A2. While the artificial muscles 100 of the artificial muscle stack 201 comprise four tab portions 132, 154 (i.e., each electrode 106, 108 of the electrode pair 104 of each artificial muscles 100 comprises four tab portions 132, 154), it should be understood that embodiments are contemplated with artificial muscles 100 comprising more or less than four tab portions 132, 154. These embodiments may comprise more than two tab axis, such as in an embodiment with three tab portions per electrode, five tab portions per electrode, or six tab portions per electrode, or just a single tab axis, such as embodiments comprising a single pair of diametrically opposed tab portions. Moreover, it should be understood that embodiments are contemplated in which other artificial muscle designs are arranged in an alternatingly offset arrangement, for example, triangular or rectangular artificial muscles.

Referring still to FIGS. 8A-8E, embodiments of the artificial muscle stack 201 comprising at least three artificial muscle layers 210 include at least one inner artificial muscle layer, which is an artificial muscle layer 210 adjacent two other artificial muscle layers 210. In these embodiments, each inner artificial muscle layer is offset a first adjacent artificial muscle layer along a first tab axis A1 and offset a second adjacent artificial muscle layer along a second tab axis A2. This multi-axis offset is depicted in the side views of FIGS. 8B-8E by a lateral shift, which depicts an offset along one tab axis, and by a relative line thickness, which depicts an offset along the other tab axis. In FIGS. 8B and 8C, offsets between artificial muscle layers 210 along the second tab axis A2 are shown by a lateral shift and offsets between adjacent artificial muscle layers 210 along the first tab axis A1 are shown by a relative line thickness. In particular, a wider line thickness in FIGS. 8B and 8C denotes artificial muscle layers 210 shifted along the first tab axis A1 into the foreground (i.e., out of the page) and a narrower line thickness in FIGS. 8B and 8C denotes artificial muscle layers 210 shifted along the first tab axis A1 into the background (i.e., into the page). In FIGS. 8D and 8E, offsets between artificial muscle layers 210 along the first tab axis A1 are shown by a lateral shift and offsets between adjacent artificial muscle layers 210 along the second tab axis A2 are shown by a relative line thickness. In particular, a wider line thickness in FIGS. 8D and 8E denotes artificial muscle layers 210 shifted along the second tab axis A2 into the foreground (i.e., out of the page) and a narrower line thickness in FIGS. 8D and 8E denotes artificial muscle layers 210 shifted along the second tab axis A2 into the background (i.e., into the page).

In FIGS. 8A-8E, the second artificial muscle layer 210B and the third artificial muscle layer 210C are inner artificial muscle layers. The second artificial muscle layer 210B is offset from the first artificial muscle layer 310A along the first tab axis A1 and offset from the third artificial muscle layer 210C along the second tab axis A2. The third artificial muscle layer 210C is offset from the second artificial muscle layer 210B along the second tab axis A2 and offset from the fourth artificial muscle layer 210D along the first tab axis A1. In artificial muscle stacks 201 with increased numbers of artificial muscle layers 210, this pattern may repeat allowing for a closely packed stacked arrangement of artificial muscle layers 210.

Referring still to FIGS. 8A-8E, the overlap between the tab portions 132, 154 and expandable fluid region 196 in adjacent artificial muscle layers 210 in the alternatingly offset arrangement of the artificial muscle stack 201 allows an increased number artificial muscles 100 to be disposed within a particular footprint when compared to embodiments of artificial muscle stacks with no offset overlap. Indeed, the artificial muscle stack 201 maximizes the number of artificial muscles 100 that may be disposed in a particular footprint, in both a lateral direction (i.e., along the first and second tab axes A1, A2) and in a depth direction, maximizing the collective actuation force per unit volume of the artificial muscle stack 201. When each artificial muscle 100 actuates, the tab portions 132, 154 of the electrode pair 104 close together (e.g., flatten) and the expandable fluid region 196 expands. Because the tab portions 132, 154 flatten, expandable fluid regions 196 of artificial muscles 100 may be positioned above and/or below tab portions of adjacent artificial muscle layers 210. This allows an increased number of artificial muscles 100 to be positioned together in a condensed block (i.e., the artificial muscle stack 201) and operate cooperatively. Indeed, the artificial muscle stack 201 is designed such that the artificial muscles 100 of each artificial muscle layer 210 are able to express their collective force in an additive manner.

As shown in FIGS. 8A-8E, the alternating offset arrangement of the plurality of artificial muscle layers 210 of the artificial muscle stack 201 creates a symmetry imbalance along the edges of the artificial muscle stack 201. That is, due to the alternating offset arrangement, the artificial muscle layers 210 may laterally terminate at different locations, leaving edge gaps in the artificial muscle stack 201.

Referring now to FIG. 9, an actuation system 300 may be provided for operating the inflation system 10 of FIG. 1 and, more particularly, each individual artificial muscle 100 of the artificial muscle stack 201 of the inflation system 10. The actuation system 300 may comprise the controller 18, an operating device 306, the power supply 20, the fluid supply 22, a display device 302, network interface hardware 304, and a communication path 301 communicatively coupled these components.

The controller 18 comprises a processor 312 and a non-transitory electronic memory 314 to which various components are communicatively coupled. In some embodiments, the processor 312 and the non-transitory electronic memory 314 and/or the other components are included within a single device. In other embodiments, the processor 413 and the non-transitory electronic memory 314 and/or the other components may be distributed among multiple devices that are communicatively coupled. The controller 18 includes non-transitory electronic memory 314 that stores a set of machine-readable instructions. The processor 312 executes the machine-readable instructions stored in the non-transitory electronic memory 314. The non-transitory electronic memory 314 may comprise RAM, ROM, flash memories, hard drives, or any device capable of storing machine-readable instructions such that the machine-readable instructions can be accessed by the processor 312. Accordingly, the actuation system 300 described herein may be implemented in any conventional computer programming language, as pre-programmed hardware elements, or as a combination of hardware and software components. The non-transitory electronic memory 314 may be implemented as one memory module or a plurality of memory modules.

In some embodiments, the non-transitory electronic memory 314 includes instructions for executing the functions of the actuation system 300. The instructions may include instructions for operating the artificial muscle stack 201, for example, instructions for actuating the one or more artificial muscles 100, individually or collectively, and actuating the artificial muscle layers 210, individually or collectively.

The processor 312 may be any device capable of executing machine-readable instructions. For example, the processor 312 may be an integrated circuit, a microchip, a computer, or any other computing device. The non-transitory electronic memory 314 and the processor 312 are coupled to the communication path 301 that provides signal interconnectivity between various components and/or modules of the actuation system 300. Accordingly, the communication path 301 may communicatively couple any number of processors with one another, and allow the modules coupled to the communication path 301 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 9, the communication path 301 communicatively couples the processor 312 and the non-transitory electronic memory 314 of the controller 18 with a plurality of other components of the actuation system 300. For example, the actuation system 300 depicted in FIG. 9 includes the processor 312 and the non-transitory electronic memory 314 communicatively coupled with the operating device 306 and the power supply 20.

The operating device 306 allows for a user to control operation of the artificial muscles 100 of the artificial muscle stack 201. In some embodiments, the operating device 306 may be a switch, toggle, button, or any combination of controls to provide user operation. The operating device 306 is coupled to the communication path 301 such that the communication path 301 communicatively couples the operating device 306 to other modules of the actuation system 300. The operating device 306 may provide a user interface for receiving user instructions as to a specific operating configuration of the artificial muscle stack 201.

The power supply 20 (e.g., battery) provides power to the one or more artificial muscles 100 of the artificial muscle stack 201. In some embodiments, the power supply 20 is a rechargeable direct current power source. It is to be understood that the power supply 20 may be a single power supply or battery for providing power to the one or more artificial muscles 100 of the artificial muscle stack 201. A power adapter (not shown) may be provided and electrically coupled via a wiring harness or the like for providing power to the one or more artificial muscles 100 of the artificial muscle stack 201 via the power supply 20. Indeed, the power supply 20 is a device that can receive power at one level (e.g., one voltage, power level, or current) and output power at a second level (e.g., a second voltage, power level, or current). As noted herein, the power supply 20 may include a solar panel for providing power to the one or more artificial muscles 100.

In some embodiments, the actuation system 300 also includes a display device 302. The display device 302 is coupled to the communication path 301 such that the communication path 301 communicatively couples the display device 302 to other modules of the actuation system 300. The display device 302 may be a touchscreen that, in addition to providing optical information, detects the presence and location of a tactile input upon a surface of or adjacent to the display device 302. Accordingly, the display device 302 may include the operating device 306 and receive mechanical input directly upon the optical output provided by the display device 302.

In some embodiments, the actuation system 300 includes network interface hardware 304 for communicatively coupling the actuation system 300 to a portable device 318 via a network 316. The portable device 318 may include, without limitation, a smartphone, a tablet, a personal media player, or any other electric device that includes wireless communication functionality. It is to be appreciated that, when provided, the portable device 318 may serve to provide user commands to the controller 18, instead of the operating device 306. As such, a user may be able to control or set a program for controlling the artificial muscles 100 of the artificial muscle stack 201 utilizing the controls of the operating device 306. Thus, the artificial muscles 100 of the artificial muscle stack 201 may be controlled remotely via the portable device 318 wirelessly communicating with the controller 18 via the network 316.

It should now be understood that embodiments described herein are directed to inflation systems and inflation segments forming a modular inflation system. Each inflation segment includes an inflation enclosure and a plurality of artificial muscle layers provided within the inflation enclosure in a stacked arrangement. Each artificial muscle layer includes one or more artificial muscles. The artificial muscles of the artificial muscle layers are operable between an actuated state and a non-actuated state. One or more fastening members are provided for attaching a plurality of the inflation segments to another to form the modular inflation system. By permitting a plurality of inflation segments to be attached to one another, an inflation system having any suitable shape and size may be formed for a variety of purposes such as, for example, a car lift, an inflatable raft, a blanket, and the like.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An inflation segment comprising:
an inflation enclosure; and
a plurality of artificial muscle layers provided within the inflation enclosure in a stacked arrangement, each of the plurality of artificial muscle layers comprising one or more artificial muscles, wherein:
the one or more artificial muscles of each of the plurality of artificial muscle layers are operable between an actuated state and a non-actuated state; and
one or more fastening members including an electrical contact for electrically coupling the inflation segment to another inflation segment.

2. The inflation segment of claim 1, wherein the one or more fastening members are provided on one or more of sides of the inflation enclosure.

3. The inflation segment of claim 1, further comprising:
a second inflation enclosure; and
a plurality of artificial muscle layers provided within the second inflation enclosure in a stacked arrangement; and
an inflatable air pocket provided between the inflation enclosure and the second inflation enclosure, wherein the inflatable air pocket is operable between an inflated state and a deflated state.

4. The inflation segment of claim 1, wherein each artificial muscle comprises:
a housing comprising an electrode region and an expandable fluid region;
a dielectric fluid housed within the housing; and
an electrode pair comprising a first electrode and a second electrode positioned in the electrode region of the housing, wherein:
at least one of the first electrode and the second electrode comprises a central opening encircling the expandable fluid region.

5. The inflation segment of claim 4, wherein:
the first electrode and the second electrode each comprise two or more tab portions and two or more bridge portions;
each of the two or more bridge portions interconnects adjacent tab portions;
the central opening is positioned between the two or more tab portions; and
the one or more artificial muscles are arranged such that the expandable fluid region of the one or more artificial muscles of one of the plurality of artificial muscle layers overlaps at least one tab portion of the one or more artificial muscles of an adjacent artificial muscle layer of the plurality of artificial muscle layers.

6. The inflation segment of claim 5, wherein adjacent artificial muscle layers are offset from one another along one or more tab axes, each tab axis extending from a center axis of the expandable fluid region of an individual artificial muscle of the plurality of artificial muscle layers to an end of at least one of the two or more tab portions of the individual artificial muscle of the plurality of artificial muscle layers.

7. The inflation segment of claim 6, wherein the plurality of artificial muscle layers comprise at least three artificial muscle layers and each inner artificial muscle layer is offset a first adjacent artificial muscle layer along a first tab axis and offset a second adjacent artificial muscle layer along a second tab axis.

8. An inflation system comprising:
a plurality of inflation segments, each inflation segment comprising:
a pair of inflation enclosures;
a plurality of artificial muscle layers provided within each inflation enclosure in a stacked arrangement, each of the plurality of artificial muscle layers comprising one or more artificial muscles; and
an inflatable air pocket provided between the pair of inflation enclosures, the inflatable air pocket operable between an inflated state and a deflated state, wherein:
the one or more artificial muscles of each of the plurality of artificial muscle layers are operable between an actuated state and a non-actuated state; and
one or more fastening members for attaching one or more of the plurality of inflation segments to another of the plurality of inflation segments, the fastening members including a port placing the inflatable air pocket in fluid communication with a fluid supply.

9. The inflation system of claim 8, wherein the one or more fastening members are provided on one or more of sides of each inflation enclosure.

10. The inflation system of claim 8, wherein each artificial muscle comprises:
a housing comprising an electrode region and an expandable fluid region;
a dielectric fluid housed within the housing; and
an electrode pair comprising a first electrode and a second electrode positioned in the electrode region of the housing, wherein:
at least one of the first electrode and the second electrode comprises a central opening encircling the expandable fluid region.

11. The inflation system of claim 10, wherein:
the first electrode and the second electrode each comprise two or more tab portions and two or more bridge portions;
each of the two or more bridge portions interconnects adjacent tab portions;
the central opening is positioned between the two or more tab portions; and
the one or more artificial muscles are arranged such that the expandable fluid region of the one or more artificial muscles of one of the plurality of artificial muscle layers overlaps at least one tab portion of the one or more artificial muscles of an adjacent artificial muscle layer of the plurality of artificial muscle layers.

12. The inflation system of claim 11, wherein adjacent artificial muscle layers are offset from one another along one or more tab axes, each tab axis extending from a center axis of the expandable fluid region of an individual artificial muscle of the plurality of artificial muscle layers to an end of at least one of the two or more tab portions of the individual artificial muscle of the plurality of artificial muscle layers.

13. The inflation system of claim 12, wherein the plurality of artificial muscle layers comprise at least three artificial muscle layers and each inner artificial muscle layer is offset a first adjacent artificial muscle layer along a first tab axis and offset a second adjacent artificial muscle layer along a second tab axis.

14. A method for actuating an inflation system, the method comprising:
connecting a plurality of inflation segments to one another at adjacent sides with one or more fastening members, the one or more fastening members including an electrical contact electrically coupling the plurality of inflation segments, each inflation segment comprising:

an inflation enclosure; and a plurality of artificial muscle layers provided within the inflation enclosure in a stacked arrangement, each of the plurality of artificial muscle layers comprising one or more artificial muscles, each artificial muscle comprising a housing having an electrode region, an expandable fluid region, and an electrode pair positioned in the electrode region of the housing, providing a voltage using a power supply electrically coupled to the electrode pair of each artificial muscle of the plurality of artificial muscle layers; and applying the voltage to the electrode pair of at least one artificial muscle of at least one of the plurality of artificial muscle layers, thereby actuating the electrode pair of the at least one artificial muscle from a non-actuated state to an actuated state.

15. The method of claim 14, further comprising:

delivering a fluid into an inflatable air pocket provided between the inflation enclosure and a second inflation enclosure of the plurality of inflation segments, a plurality of artificial muscle layers provided within the second inflation enclosure in a stacked arrangement, wherein the inflatable air pocket is operable between an inflated state and a deflated state.

16. The method of claim 14, wherein:

each artificial muscle comprises:

a dielectric fluid housed within the housing; and the electrode pair comprises a first electrode and a second electrode positioned in the electrode region of the housing, wherein:

at least one of the first electrode and the second electrode comprises a central opening encircling the expandable fluid region, in response to applying the voltage, the electrode pair is attracted to one another and the dielectric fluid is directed into the expandable fluid region of the housing by the electrode pair to expand the expandable fluid region.

17. The method of claim 16, wherein:

the first electrode and the second electrode each comprise two or more tab portions and two or more bridge portions;

each of the two or more bridge portions interconnects adjacent tab portions;

the central opening is positioned between the two or more tab portions; and the one or more artificial muscles are arranged such that the expandable fluid region of the one or more artificial muscles of one of the plurality of artificial muscle layers overlaps at least one tab portion of the one or more artificial muscles of an adjacent artificial muscle layer of the plurality of artificial muscle layers.

18. The method of claim 17, wherein adjacent artificial muscle layers are offset from one another along one or more tab axes, each tab axis extending from a center axis of the expandable fluid region of an individual artificial muscle of the plurality of artificial muscle layers to an end of at least one of the two or more tab portions of the individual artificial muscle of the plurality of artificial muscle layers.

19. The method of claim 18, wherein the plurality of artificial muscle layers comprise at least three artificial muscle layers and each inner artificial muscle layer is offset a first adjacent artificial muscle layer along a first tab axis and offset a second adjacent artificial muscle layer along a second tab axis.

* * * * *

UNITED STATES PATENT AND TRADEMARK OFFICE
CERTIFICATE OF CORRECTION

| | |
|---|---|
| PATENT NO. | : 11,689,123 B2 |
| APPLICATION NO. | : 17/217166 |
| DATED | : June 27, 2023 |
| INVENTOR(S) | : Ty B. Ebling and Michael P. Rowe |

It is certified that error appears in the above-identified patent and that said Letters Patent is hereby corrected as shown below:

In the Specification

In Column 7, Line(s) 12, after "four tab", delete "portion" and insert --portions--, therefor.

In Column 14, Line(s) 20, after "increased number", insert --of--.

Signed and Sealed this
First Day of August, 2023

*Katherine Kelly Vidal*

Katherine Kelly Vidal
*Director of the United States Patent and Trademark Office*